(12) United States Patent
Leighton et al.

(10) Patent No.: US 11,277,449 B2
(45) Date of Patent: Mar. 15, 2022

(54) ADAPTIVE DISTRIBUTIVE DATA PROTECTION SYSTEM

(71) Applicant: Virtustream IP Holding Company LLC, Bethesda, MD (US)

(72) Inventors: Gregsie Leighton, Buford, GA (US); Julius Bernotas, Vilnius (LT); Vaidotas Simaitis, Kaunas (LT)

(73) Assignee: Virtustream IP Holding Company LLC, Bethesda, MD (US)

(*) Notice: Subject to any disclaimer, the term of this patent is extended or adjusted under 35 U.S.C. 154(b) by 450 days.

(21) Appl. No.: 16/402,495

(22) Filed: May 3, 2019

(65) Prior Publication Data
US 2020/0351310 A1 Nov. 5, 2020

(51) Int. Cl.
| | | |
|---|---|---|
| *H04L 29/06* | (2006.01) | |
| *G06F 21/62* | (2013.01) | |
| *G06N 20/00* | (2019.01) | |
| *H04L 9/32* | (2006.01) | |
| *H04L 9/06* | (2006.01) | |
| *G06K 9/62* | (2022.01) | |

(52) U.S. Cl.
CPC ........ *H04L 63/205* (2013.01); *G06F 21/6227* (2013.01); *G06F 21/6254* (2013.01); *G06K 9/6257* (2013.01); *G06N 20/00* (2019.01); *H04L 9/0637* (2013.01); *H04L 9/3234* (2013.01); *H04L 2209/38* (2013.01)

(58) Field of Classification Search
CPC . G06K 9/6257; G06F 21/645; G06F 21/6227; G06F 21/6254; G06N 5/003; G06N 20/20; G06N 20/00; H04L 63/0428; H04L 63/205; H04L 9/0637; H04L 9/3239; H04L 9/3234; H04L 2209/38
USPC .......................................................... 726/1
See application file for complete search history.

(56) References Cited

U.S. PATENT DOCUMENTS

| | | | |
|---|---|---|---|
| 9,294,268 B2* | 3/2016 | von Mueller | H04L 9/0625 |
| 9,626,629 B2* | 4/2017 | Vijayaraghavan | G06N 5/02 |
| 10,055,600 B2* | 8/2018 | Shukla | G06F 21/6245 |
| 10,546,154 B2* | 1/2020 | Praveen | G06K 9/00536 |
| 10,700,853 B2* | 6/2020 | Kravitz | G06Q 20/401 |
| 10,789,373 B2* | 9/2020 | Reid | H04L 9/3271 |
| 2016/0020904 A1* | 1/2016 | Ioannidis | G06F 17/16 |
| | | | 713/174 |

* cited by examiner

*Primary Examiner* — Amare F Tabor
(74) *Attorney, Agent, or Firm* — Ryan, Mason & Lewis, LLP

(57) ABSTRACT

Embodiments for protecting data stored and transmitted in a computer network, by receiving confidential data from a client, the data organized into labeled fields and corresponding data elements; filtering the received data to identify fields that require data masking; generating a security prediction on the corresponding data elements using a machine learning process; separating the masked data into tokenized data having a respective token associated with each corresponding data element; and storing the tokenized data on a blockchain secure ledger to ensure integrity of the received data and prevent an ability to tamper with the received data.

20 Claims, 9 Drawing Sheets

200

ADAPTIVE DISTRIBUTED DATA PROTECTION

MACHINE LEARNING DATA IDENTIFICATION PROCESSOR
202

DATA ENCRYPTION PROCESSOR
204

DATA TOKENIZATION PROCESSOR
206

BLOCKCHAIN SECURE LEDGER DATA STORAGE PROCESSOR
208

FIG. 2

ADAPTIVE DISTRIBUTIVE DATA PROTECTION SYSTEM

TECHNICAL FIELD

Embodiments are generally directed to data security, and more specifically to using machine learning and blockchain technology for adaptive data protection systems.

BACKGROUND

In present data storage systems, single packets of data at rest on one compute or storage node are typically protected using encryption of all the data using an encryption key and encryption algorithm. This leaves data susceptible to data leakage from a single system element or endpoint security breach. In such a system, distributing sensitive data across multiple compute/storage nodes increases the likelihood of access to complete sets of sensitive data during a single endpoint or system breach.

Present data security systems usually require personnel (e.g., system administrators, users) to classify and identify data to protect. They must manually define the approaches to protect the data, which is inefficient and prone to human error. In such a system, people interact with the system to classify and identify sensitive data, thus presenting challenges that usually lead to data being under-protected over time and susceptible to network/system data breaches. For example, in common multi-tenant systems, data stored at rest for multi-tenant software is usually separated and protected by application code and data field identification of which tenant owns which data. Most protection methods thus rely on user-defined static definitions that may be vulnerable to hacking and security breaches.

What is needed is a way to provide an adaptive distributed data protection system that secures data at rest or during transmission over unencrypted data network channels. What is further needed is a system where multi-tenant data is protected by token-based encryption techniques that restrict tenant access exclusively to their own specific data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 2 illustrates the main functional components of the adaptive protection process, under some embodiments.

DETAILED DESCRIPTION

Figure 1:
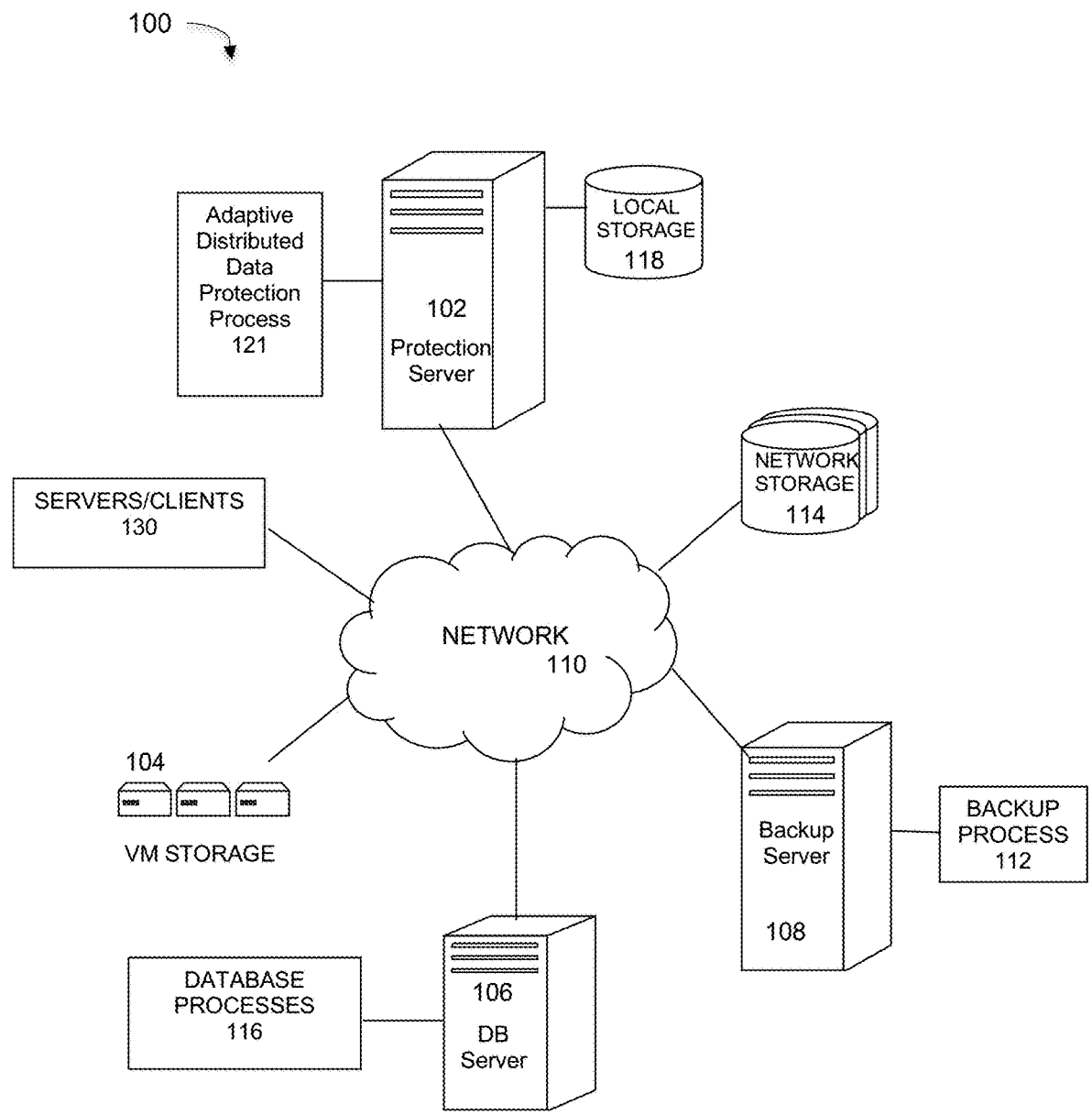
FIG. 1 illustrates a large-scale network implementing an adaptive distributed data protection process using machine learning and blockchain technology, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Some embodiments of the invention involve large-scale IT networks or distributed systems (also referred to as "environments"), such as a cloud network system or very large-scale wide area network (WAN), or metropolitan area network (MAN). However, those skilled in the art will appreciate that embodiments are not so limited, and may include smaller-scale networks, such as LANs (local area networks). Thus, aspects of the one or more embodiments described herein may be implemented on one or more computers in any appropriate scale of network environment, and executing software instructions, and the computers may be networked in a client-server arrangement or similar distributed computer network.

Embodiments include an adaptive distributed data protection system that secures data at rest or during transmission over an unencrypted data network channel across geographic boundaries or data. The system has components which incorporates aspects of blockchain secure distributed ledgers, encryption and machine learning. Such a system can be effectively utilized by systems that are required to protect data based on data security and certain regulatory compliance standards (e.g., HIPPA, PCI, and GDPR).

FIG. 1 is a diagram of a network implementing an adaptive distributed data protection system and process, under some embodiments. FIG. 1 illustrates an enterprise-scale data processing and storage system that implements certain data transmission and backup processes using storage devices, though embodiments are not so limited.

A backup server 108 executes a data replication or similar backup management process 112 that coordinates or manages the backup of data from one or more data sources, such as the database servers 106, or other servers/clients 130 to storage devices, such as network storage 114 and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114.

The network server computers are coupled directly or indirectly to the target VMs, and to the data sources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage, e.g., 118. The storage devices represent protection storage devices that serve to protect the system data through the backup process. Thus, backup process 112 causes or facilitates the backup of this data to the storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source (e.g., DB server 106) may be any appropriate data, such as database data that is part of a database management system 116, and the data may reside on one or more hard drives for the database(s) in a variety of formats. Database processes 116 represent only one type of application that may be supported by system 100, and many other applications, such as data gathering, large scale calculations, and so on, may also be supported.

For the embodiment of FIG. 1, network 100 also includes a data protection server 102 that executes an adaptive distributed data protection process, 121. This process component uses certain machine learning and blockchain techniques to secure data at rest in system 100 and during transmission over unencrypted data network channels that may be present in network 110 or any other links between the network resources. For the embodiment of FIG. 1, process 121 is shown as executed by a dedicated server 102, however embodiments are not so limited. Such a process may be executed by or within any other server or processing component in system 100, such as by backup server 108, database server 106, and so on.

Although embodiments are described and illustrated with respect to certain example implementations, platforms, and applications, it should be noted that embodiments are not so limited, and any appropriate network supporting or executing any application may utilize aspects of the adaptive distributed data protection process as described herein. Furthermore, network environment 100 may be of any practical scale depending on the number of devices, components, interfaces, etc. as represented by the server/clients 130 and other elements of the network.

As stated above, the data generated or sourced by system 100 and transmitted over network 110 may be stored in any number of persistent storage locations and devices, such as local client storage, server storage, or other network storage. The data may also be transmitted over encrypted or unencrypted data links of any practical length, such as across significant geographic distances. Embodiments of system 121 make the distribution of sensitive data across multiple compute/storage nodes to decrease the likelihood of access to complete data sets of sensitive data during a single endpoint/system breach. It helps classify and identify sensitive data with machine learning algorithms, and utilizes encryption techniques that require a tenant to know a unique token identifier or key to gain access to their specific data which is distributed across a secure ledger. Embodiments include some combinations of all these techniques into a single adaptive data protection system.

The adaptive data protection process is intended and configured to be adaptable to meet current and future data protection security and regulatory compliance requirements, and ensures integrity utilizing the following tamper proofing and data protection techniques. These include artificial intelligence (AI) filters that identify and specify fields that require data masking; adaptable machine learning processes that evolve to meet security standard predictions; separation of masked data split into multi-tenancy tokenized data; storage of tokenized data on a blockchain secure ledger to ensure the integrity of received and sent data; and separate data ownership across multiple parties and tenants.

FIG. 2 illustrates the main functional components of the adaptive data protection system and process, under some embodiments. As shown in FIG. 2, adaptive distributed data protection system 200 comprises a machine learning data identification processor 202, a data encryption processor 204, a data tokenization processor, 206, and a blockchain secure ledger data storage processor, 208.

The machine learning data identification processor 202 identifies and categorizes sensitive data that requires protection. As is known, machine learning algorithms build a mathematical model based on sample or training data to enable predictions to be made on data sets. In a supervised learning case, the algorithm builds a mathematical model from a set of data that contains both the inputs and the desired outputs. In special cases, the input may be only partially available, or restricted to special feedback. Semi-supervised learning algorithms develop models from incomplete training data, where a portion of the sample input does not have labels. Supervised learning utilizes classification algorithms, such as when the outputs are restricted to a limited set of values, and regression algorithms, that have continuous outputs, i.e., the outputs may have any value within a range. As is known, regression analysis is a set of statistical processes for estimating the relationships among variables. It includes many techniques for modeling and analyzing several variables, when the focus is on the relationship between a dependent variable and one or more independent variables (or 'predictors'). More specifically, regression analysis helps one understand how the typical value of the dependent variable (or 'criterion variable') changes when any one of the independent variables is varied, while the other independent variables are held fixed Another type of machine learning is unsupervised learning in which the algorithm builds a mathematical model from a set of data which contains only inputs and no desired output labels. Unsupervised learning algorithms are used to find structure in the data, like grouping or clustering of data points. Unsupervised learning can discover patterns in the data, and can group the inputs into categories, as in feature learning. The number of features may be reduced through a process of dimensionality reduction.

Other types of machine learning methods include active learning, in which algorithms access the desired outputs (training labels) for a limited set of inputs based on a budget, and optimize the choice of inputs for which it will acquire training labels. Reinforcement algorithms are given feedback in the form of positive or negative reinforcement in a dynamic environment.

Figure 3A:
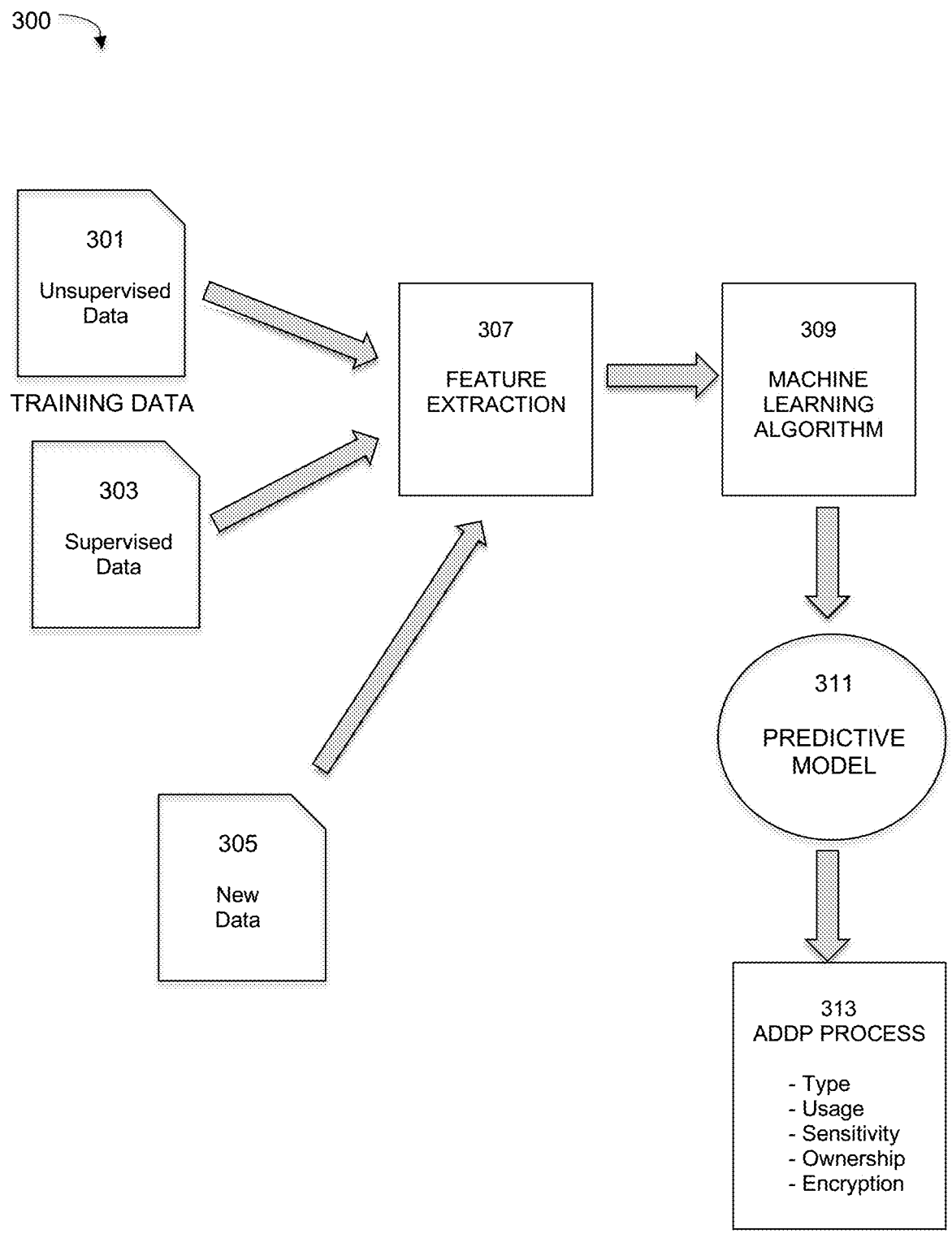
FIG. 3A is a block diagram illustrating an overall operation of a machine learning process within an adaptive distributed data protection system, under some embodiments.

In an embodiment, the machine learning processor 202 may implement one or more of the above-described machine learning techniques. FIG. 3A is a block diagram illustrating an overall operation of a machine learning process within an adaptive distributed data protection system, under some embodiments. As shown in diagram 300, the data processed may comprise unsupervised data 301 or supervised data 303 as training data. The data is input to a feature extraction process 307, which reduces initial sets of raw variables into more manageable groups for processing, while still accurately and completely describing the original data set.

The data is then input to the machine learning algorithm 309, which outputs a predictive model 311. The predictive model is used by the adaptive distributed data protection system 313 to recognize and categorize the data so that decisions can be made. The processing may include typing the data, determining its usage, determining its sensitivity (i.e., highly confidential, confidential, top secret, classified, public, etc.), ownership (e.g., in multi-tenant or multi-user systems), and degree and/or type of encryption required or recommended). Other processing parameters may also be used. The model and machine learning algorithm are applied to new data 305 to categorize and process the new data automatically and without the need for user (human) processing.

Updates to any definitions, rules, regulations, and so on can be input to system 300 so that the machine learning algorithm 309 can automatically generate up-to-date predictive models based on the new information. For example, if new regulatory requirements dictate protection of new types of personal information, or higher levels of encryption, such information can be processed automatically to update the models. In this way, future data protection and regulatory compliance requirements can be easily accommodated.

In embodiment, the machine learning processor 202 utilizes a pluggable interface that supports algorithms such as a logistic regression algorithm, and decision trees (e.g., Random Forests and Boosting trees) algorithms. Example libraries that implements the decision tree algorithm are: CatBoost, which is a fast, scalable, high performance gradient boosting decision trees library; and XGBoost, which is an optimized distributed gradient boosting library designed to be highly efficient, flexible and portable.

In general, gradient boosting is a machine learning method for regression and classification problems, which produces a prediction model in the form of an ensemble of weak prediction models in the form of decision trees. It builds the model by stages and generalizes them by allowing optimization of an arbitrary differentiable loss function. Gradient boosting is built around algorithms that optimize a cost function over function space by iteratively choosing a function (weak hypothesis) that points in the negative gradient direction.

CatBoost is a gradient boosting toolkit that implements ordered boosting, a permutation-driven alternative to the classic gradient boosting algorithm, and an innovative algorithm for processing categorical features. Both techniques were fight prediction shift, which is caused by a special kind of target leakage present in all currently implementations of gradient boosting algorithms. Further details and specific implementations for Catboost can be found at https://github-.com/catboost/catboost, and "Catboost: unbiased boosting with categorical features," Prokhorenkova, Gusev, Vorobev, Dorogush, and Gulin, Moscow Institute of Physics and Technology (https://arxiv.org/pdf/1706.09516.pdf). Extreme Gradient Boosting or "XGBoost" is an optimized distributed gradient boosting library that is used for supervised learning process where training data with multiple features is used to predict a target variable. Further details and specific implementations for XGBoost can be found at https://xgboost.readthedocs.io/en/latest/build.html and https://xgboost.readthedocs.io/en/latest/tutorials/model.html. Although embodiments are described with respect to specific implementations of the Catboost and XGBoost libraries, embodiments are not so limited and any appropriate gradient boosting technique, library, toolkit or method may be used.

Figure 3B:
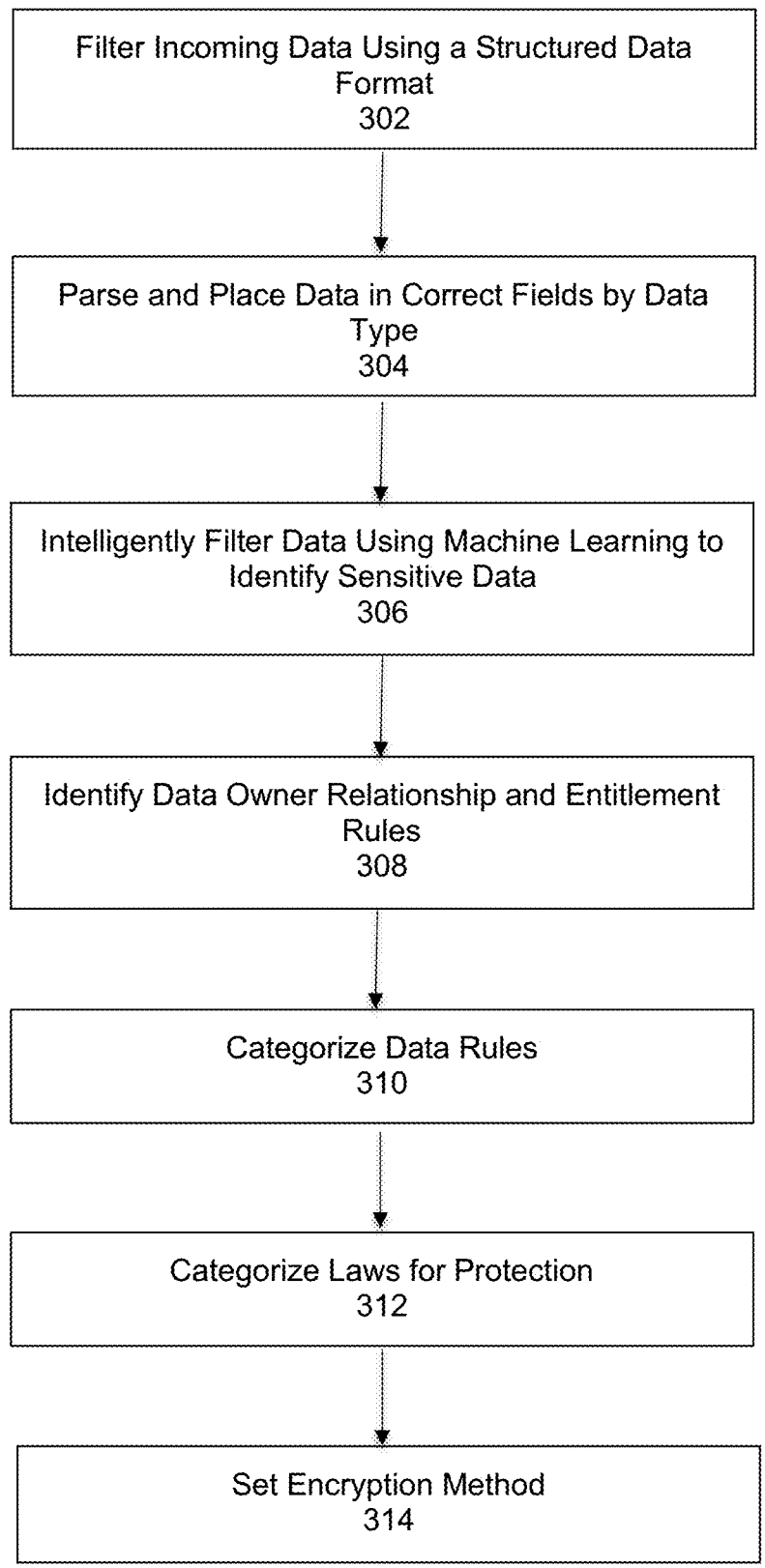
FIG. 3B is a flowchart that illustrates operation of a machine learning data identification processor, under some embodiments.

FIG. 3B is a flowchart that illustrates operation of the machine learning data identification processor 202, under some embodiments. As shown in FIG. 3, the processor first filters incoming data using structured data format (e.g., JSON or XML) by cataloging what fields can be used for what purposes, 302. This data categorization can be adaptable based on evolving rules and models. For example, there are known industry defined data types, such as string, integer, and so on, which are used to store data in various data stores or transmitted by applications between computing nodes. These known data types are already recognized by peers that exchange information with known data exchange agreements or contracts.

Multiple sources send and receive (exchange) data, and each source is required to know the specific fields, details, and formats of the data that is exchanged. This introduces the need for parsing the data to determine which format the incoming information has for each different type of data, 304. The data must be placed in the correct fields, and presented to a user, who must then decide which data is sensitive and must be protected via encryption techniques.

In step 306, a machine learning/AI processor is used to perform intelligent filtering to adapt, recognize, categorize and make decisions to identify the data. Using this solution, multiple formats of data can be sent to the host and can be protected, accepted, and processed. The AI processor learns multiple categories of data to recognize certain types of sensitive data, such as personal health care data, credit card data or any similar type of data. The AI decision making process will store some of the data in plain text if it is acceptable. For sensitive data, the pluggable module will be enabled (through encryption or tokenization methods) if needed and place the data in a secure data area. The AI filter will also send this data to the particular destinations, by knowing which host can store which what data.

The process next identifies data owner relationship and entitlement rules who owns the particular data and who can see this data, step 308. It then categorizes data rules by data type, usage, system context, sensitivity, set range, minimum encryption method strength, and other similar parameters, step 310. It also categorizes laws for protection by data type, rationale, data type patterns, sensitivity range, and other similar parameters, step 312. In step 314, it sets the encryption method, strength, algorithm API (application programming interface) location, algorithm, and API type.

The benefits of machine learning include automatic identification of new data types and formats, adaptive recognition mechanism, reduction of human error of identifying new types of data; reducing human involvement in identification process; adapting to new security regulations with rule-based approach, and encrypting data fields in any given format, and identifying the sensitive information automatically.

The data encryption processor 204 transposes data from one form to another form, or code, so that only entities (human or machine) with access to the secret key (formally called a decryption key) or static password can read it. Data masking enables organizations to protect their customer data with less computationally expensive data decryption. One example security regulatory compliance requirement GDPR states that personal data should be pseudo-anonymized in a way that it can no longer be linked (or "attributed") to a single user without the use of additional data. This additional data should be kept separate from the pseudo-anonymized data and the subject to technical and organizational measures to make it hard to link a piece of data to someone's identity which attains non-attribution.

For data tokenization, processor 206 splits the data to support multi-tenancy allowing only specific clients to access data by tokens at a certain time that they are authorized to modify or access. In an embodiment, the tokenization is handled by code books or index token techniques. The virtues of tokenization over encryption in terms of protecting data without impacting systems or processes are clear. In addition to simplifying PCI compliance, tokenization provides the ability to easily protect a broad variety of data types, thus making it a natural choice for meeting other data protection requirements including internal policies, industry standards such as HIPAA, and cross geographic region dependent laws such as GDPR. Such multi-tenancy tokenization allows the system to separate data chunks so clients or any parts which have certain permission could request data by using tokens.

The blockchain secure ledger data storage processor 208 utilizes a private blockchain community to implement certain blockchain technology. Example private blockchains include: Quorum, Corda, Hyperledger projects or Hybrid blockchain (XDC). The Blockchain secure ledger benefits include streamlining the continuous process of checking ownership and transactions. The blockchain platform importantly allows the use of unencrypted channels of communications/Attackers are increasingly using SSL (secure sockets layer) to hide their attacks. Present security tools cannot properly see this traffic and defend resources due to intensive decryption or re-encryption load on CPUs caused by the SSL traffic. Using a blockchain assures the security and integrity of data over unencrypted channels without imposing this transmission and processing overhead.

As is known, a blockchain is a growing list of records (blocks) that are cryptographically linked. Each block contains a cryptographic hash of the previous block, a timestamp, and transaction data. A blockchain is resistant to modification of the data and represents an open, distributed ledger that can record transactions between two parties efficiently and in a verifiable and permanent way. A blockchain is typically managed by a peer-to-peer network adhering to a protocol for internode communication and validating new blocks. Once recorded, the data in any given block cannot be altered retroactively without alteration of all subsequent blocks, which requires consensus of the network majority. Blockchain technology can be integrated into multiple applications, such as cryptocurrencies and smart contracts. A smart contract is a protocol intended to digitally facilitate, verify, or enforce the negotiation or performance of a contract. They allow the performance of credible transactions without third parties through transactions that are trackable and irreversible.

Figure 4:
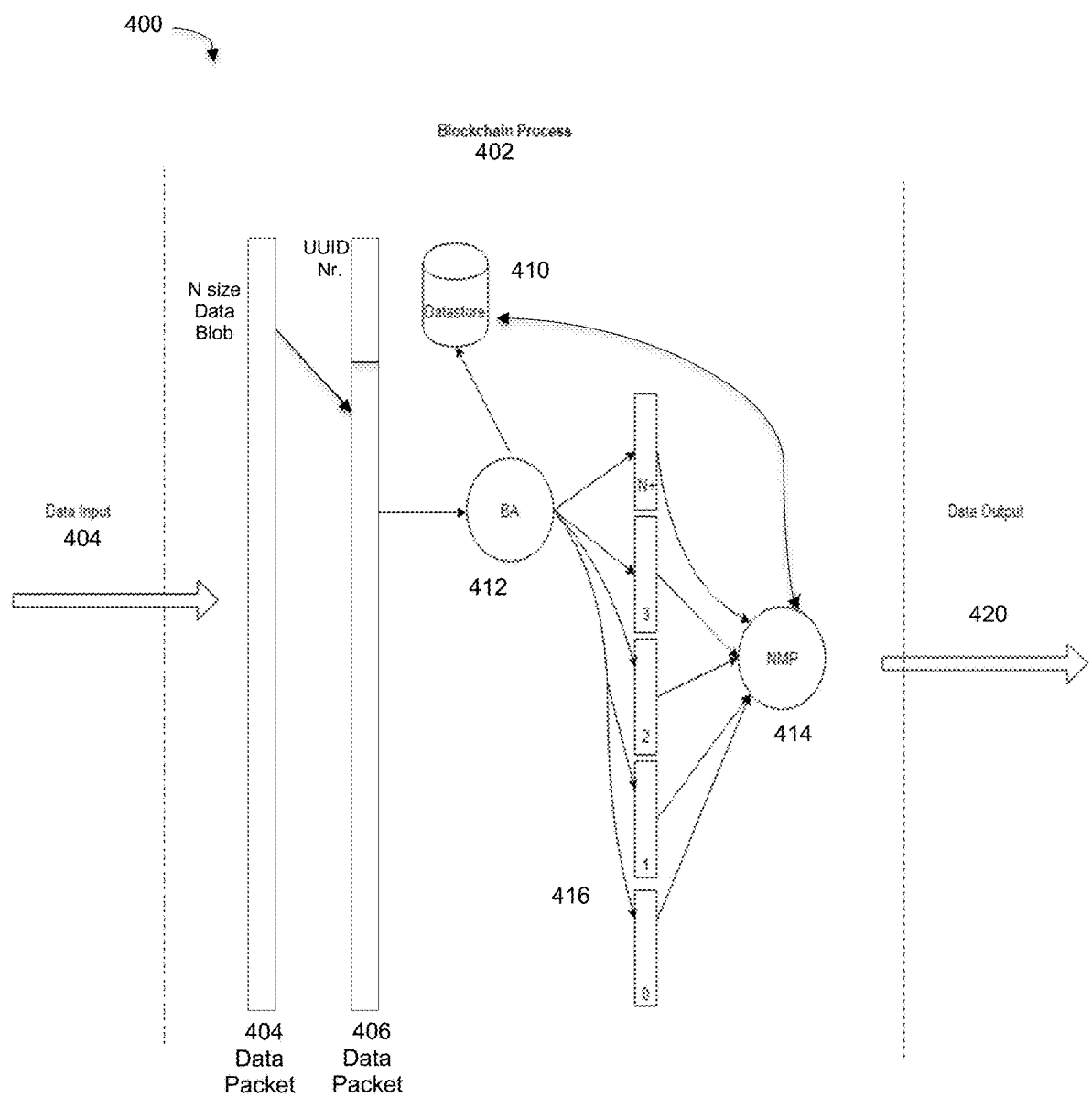
FIG. 4 illustrates a blockchain process applied to an adaptive distributed data protection system, under some embodiments.

FIG. 4 illustrates a blockchain process applied to an adaptive distributed data protection system, under some embodiments. As shown in diagram 400, data 404 input to the blockchain process 402 is input as a data packet 404 or set of data packets of N-size data blob. A universally unique identifier (UUID) may be added to the data packet 404 through a UUID generator to identify the data object and form an identified data packet 406. A UUID is a 128-bit number used to identify information in network 100. Other identifiers other than UUID may also be used instead. The data 406 is then input to a blockchain aggregator (BA) 412. The aggregator splits the data packet 406 into N different records. This creates an N-packet 416 with a new chain record segment. The blockchain aggregator 412 also outputs a unique data split sequence as records that are stored in local datastore 410 for reassembly. The N-packets 416 are input to a network module process (NMP) 414 that knows all the storage facilities and explicitly defines which segments of data go where, by randomly assigning storage locations. The NMP then provides the data output 420 using the blockchain protocol for storage on a storage device. The datastore 410 is also directly coupled to the NMP 414 to provide storage location information, which will be used for reassembling data when it comes from the storage to the client.

The splitting process 416 illustrates an embodiment of the multi-tenant case in which masked data is split into multi-tenancy tokenized data to ensure separation and restriction of access to differently owned data objects. The splitting process 416 illustrates the data blocks which were chunked by blockchain aggregator 412 and represents an unique set of objects with a blockchain sequence hash and data regardless of whether it is multi-tenant or single tenant. Each block is unique and will be processed by NMP 414 for storage at a random storage location.

The adaptive distributed data protection system 200 provides the key benefits of a decentralized data store, including: immutability, security, redundancy, accountability, and transparency. By eliminating single key protection, data is no longer vulnerable to breach or misappropriate through usage of signed certificates by stolen signing keys. This solution provides data tamper proofing due to checking the receiving data at geographic locations (storage sites).

The adaptive distributed data protection process and system 200 can be used in many different applications involving many different types of data and network resources. Any application that stores and retrieves sensitive or private information can benefit from this system.

Figure 5A:
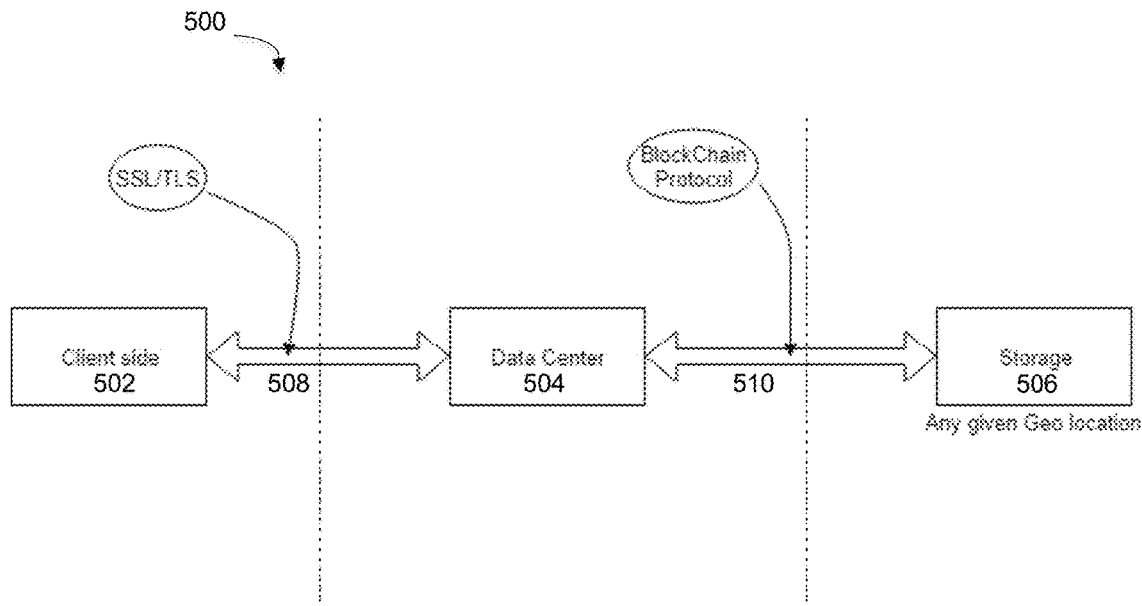
FIG. 5A is a simple block diagram of a data storage and retrieval system that implements an adaptive distributed data protection process, under some embodiments.

FIG. 5A is a simple block diagram of a data storage and retrieval system that implements an adaptive distributed data protection process, under some embodiments. Diagram 500 illustrates the overall data interaction for entities and data in a system implementing the adaptive distributed data protection process. The client-side computer 502 exchanges data with data center 504 over a SSL/TLS (secure sockets layer/transport layer security) link 508. SSL is a known technology for securing an Internet (TCP/IP) connection using certain encryption algorithms; TLS is an updated version of SSL using certain security certificates. Though embodiments are described for SSL/TSL implementation, other secure network links can also be used. The data center 504 exchanges data with storage 506, which may be any appropriate storage array or device, over link 510, which uses the blockchain protocol. Storage 506 may be local storage, but is more typically a storage site located some distance (e.g., miles, hundreds of miles) from the data center 504 and/or client 502. The scale of network 500 is thus potentially very large, such as on the order of transnational or trans-continental scale.

Figure 5B:
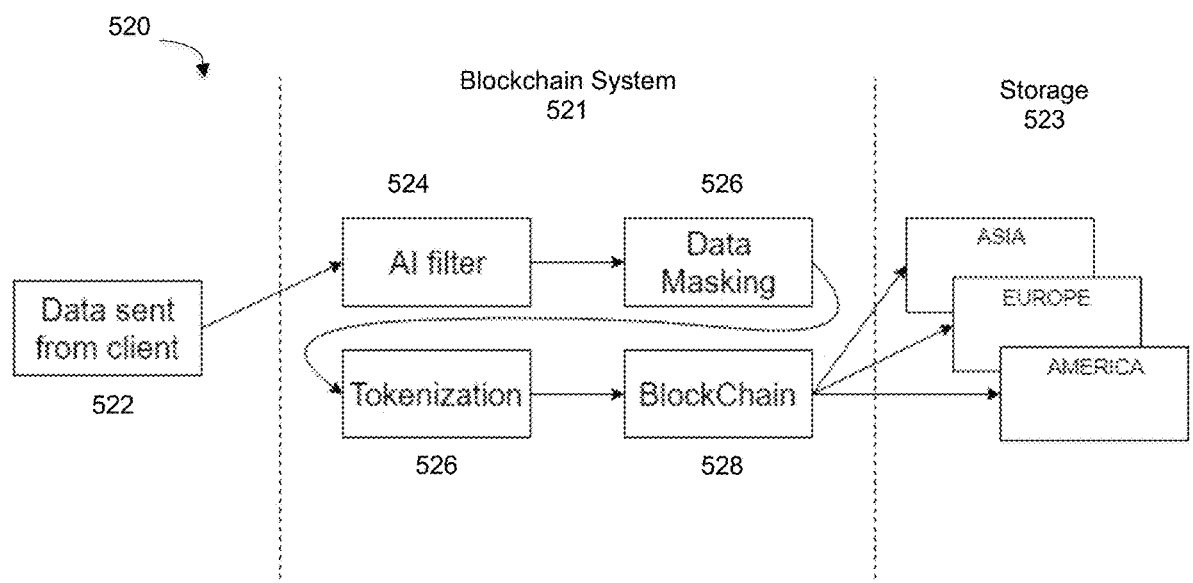
FIG. 5B illustrates the data flow through the blockchain network of FIG. 5A, under some embodiments.

FIG. 5B illustrates the data flow through the blockchain network of FIG. 5A, under some embodiments. As shown in diagram 520, data 522 sent from the client is input to a blockchain system 521 comprising an AI filter 524. The filtered data is transmitted to a data masking process 526 and from there the data is tokenized 526, and added to the blockchain 528. The blocks are then sent to storage 523, which may be in any practical geographic location or region, such as Asia, Europe, America, and so on.

Figure 6:
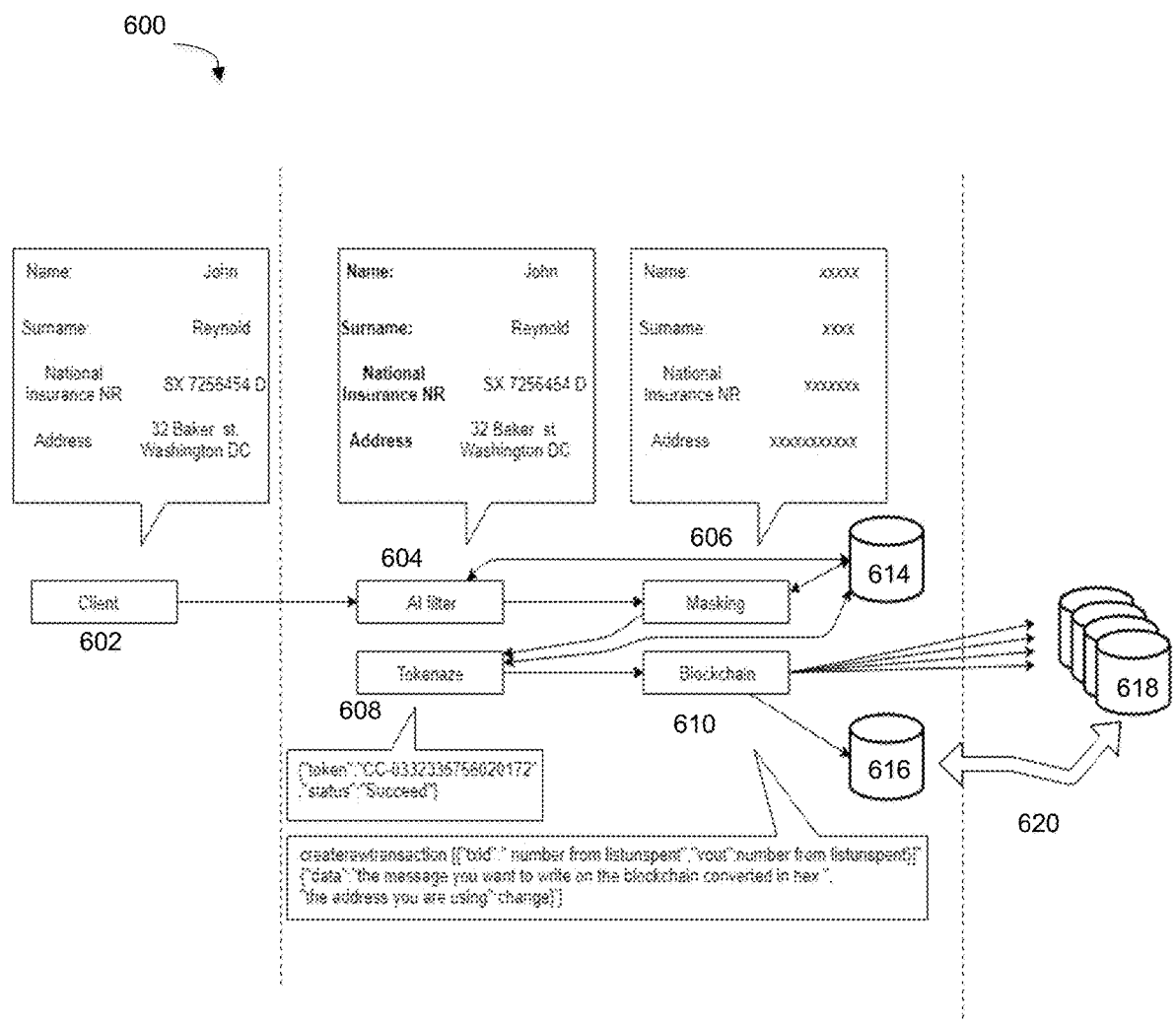
FIG. 6 illustrates an example use case of the blockchain system of FIG. 5B, under an embodiment.

FIG. 6 illustrates an example use case of the blockchain system of FIG. 5B, under an embodiment. As shown in diagram 600, and example set of data for client 602 comprises certain medical information, which is deemed to be sensitive or confidential. For the example shown in FIG. 6, the data consists of the client user's name (e.g., John Reynolds), address (e.g., 32 Baker St., Washington D.C.), and his insurance number. Of course, many other items of information may also be provided. The information is in the form of alphanumeric text that are placed in defined fields by type (First_Name, Last_Name, Street_Address, City, State, Zip_Code, Insurance Number, and so on). The AI filter 604 receives the raw data, which may or may not be formatted by a front-end database, such as a hospital or personal medical record db. The data items are then formally place into defined fields, such as Name, Surname, National Insurance NR, Address, and so on. The typed data is then masked 606. In this process the actual data elements are replaced with random alphanumeric characters to mask the actual human readable data. The field names themselves may or may not be masked also, but the data elements are masked as shown by the "xxxx" substituted for each input data element. The masked data may be stored in a dedicated storage location 614.

After masking the data is tokenized, 608. For the example of FIG. 6, a sample token "CC-0332335756020172" is generated to represent the data. The token may also be stored in a data storage, such as 614, and is then sent to blockchain processor 610, where data splitting occurs and the blockchain is mapped for further processing or reassembly, as shown in FIG. 4. One token is generated per data set regardless of the transaction. The tokens are used to reassemble the secure ledger of the blockchain 610. FIG. 6 illustrates an example transaction for the example data 602. The blockchain data is saved in storage location 616 and the sequence check for the cryptographic hash 620 is exchanged with data store 618.

The storage and retrieval of information in the blockchain system of FIG. 6 uses a key or ID to authenticate and authorize re-assembly. This is significantly different to current asymmetric encryption technology.

In an embodiment, the system uses a Username and SequenceID_1 (SeqID_1) on the client side, which is sent to a server that makes mathematical calculations using SequenceID_1 and a SequenceID_2, where SequenceID_2 is created for specific user. After these calculations the path is known for the reassembly of the data. Not specific mathematical method need be specified; however, it must not be one-way function. The SequenceID_1 and SequenceID_2 values must be calculated from the sequence of the data, and by combining them, both must be able to get sequence of the data again to reassemble the information.

Figure 7A:
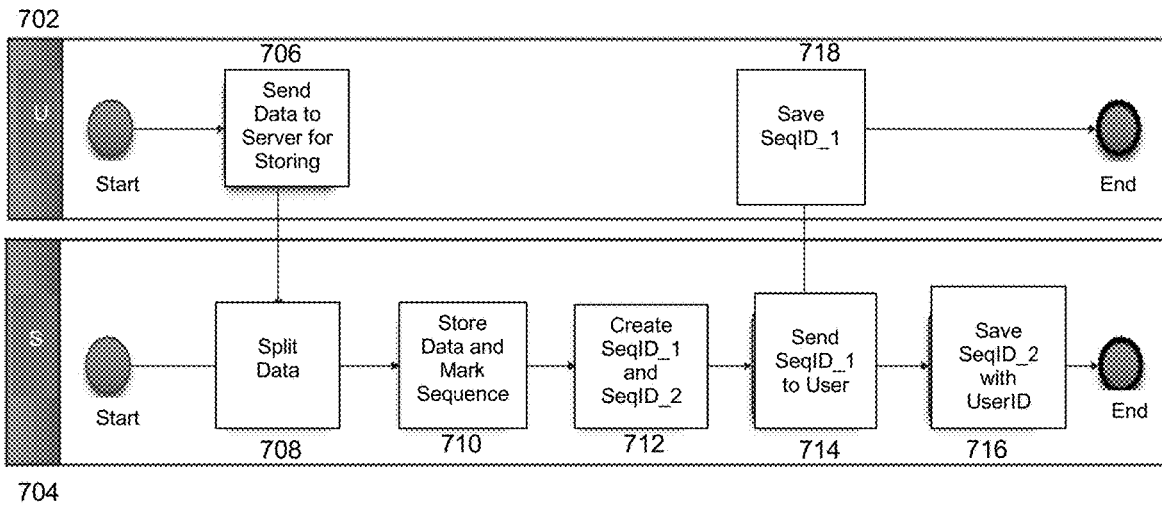
FIG. 7A illustrates a system and process for storing and retrieving data for re-assembly, under some embodiments.
Figure 7B:
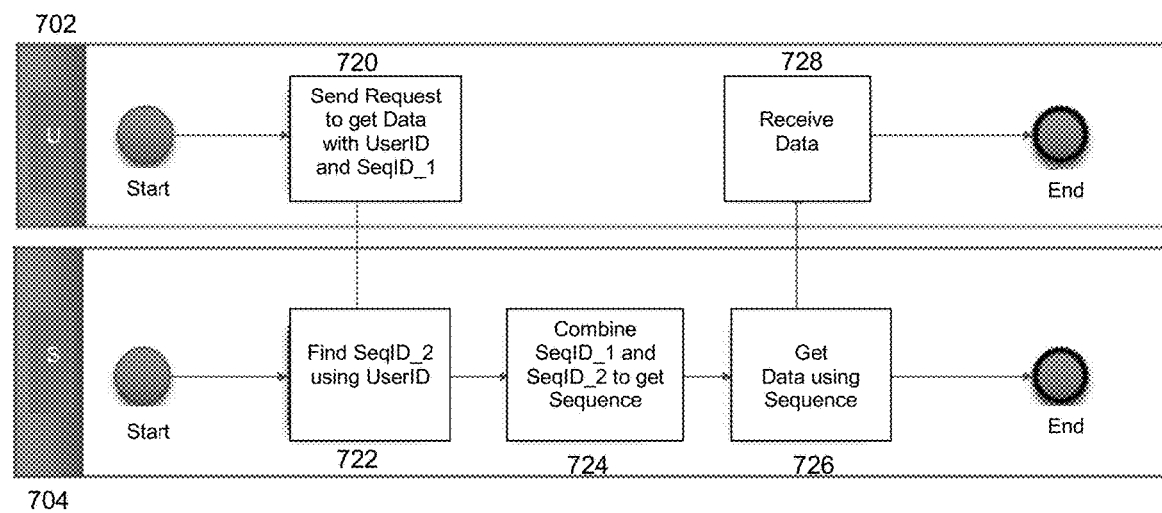
FIG. 7B illustrates a system and process for sending information to access stored information, under some embodiments.

FIG. 7A illustrates a system and process for storing data for re-assembly and FIG. 7B illustrates a system and process for sending information to access stored information, under some embodiments. Both FIGS. 7A and 7B illustrate example transactions between a user (U) 702 and a server (S) 704. As shown in FIG. 7A, the storage process begins when user 702 sends data to server 704 for storage. The server splits the data, 706, and stores the data and mask sequence, 708. The server then creates the SequenceID_1 and SequenceID_2 values based on the sequence, 712. The server sends SequenceID_1 to the user, 714 and saves the SequenceID_2 with the userID, 716. The user receives the SequenceID_1, 718, and the storage process ends. The data retrieval process of FIG. 7B begins when the user 702 sends a request to get data with his/her UserID and the SequenceID_1 value for the data, 720. The server 704 the finds the SequenceID_2 value corresponding to the UserID, 722. The server combines the SequenceID_1 and SequenceID_2 values to get the requested sequence, 724. The server then retrieves the data using the sequence 726 and sends it to the user, which receives it, 728, thus ending the process.

This system solves the challenges associated with securing the integrity of data in transmission and at rest, by utilizing adaptive machine learning, blockchain secure distributed ledger, and encryption techniques to secure information from any unauthorized access to sensitive data by human or machine users.

System Implementation

Figure 8:
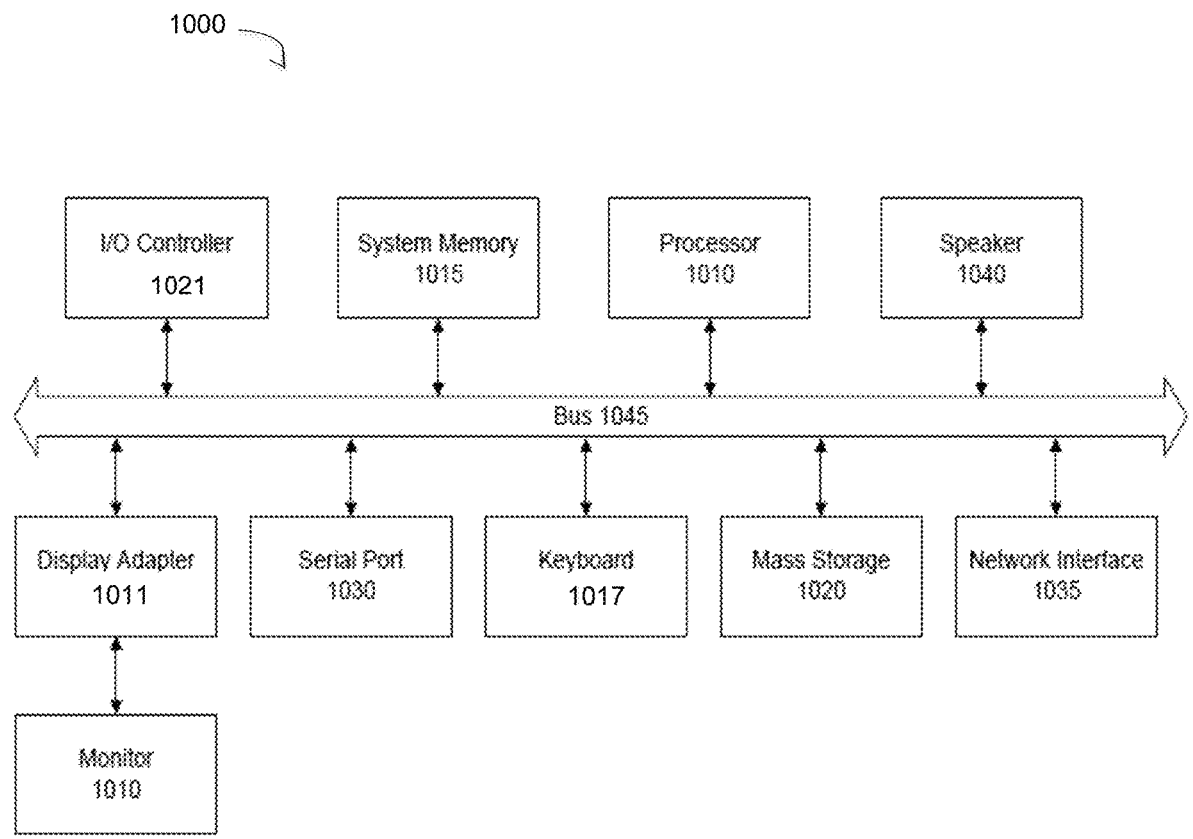
FIG. 8 is a block diagram of a computer system used to execute one or more software components of an adaptive distributed data protection process, under some embodiments.

As described above, in an embodiment, system 100 includes an adaptive distributed data protection process or component 121 that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 8 is a block diagram of a computer system used to execute one or more software components of an adaptive distributed data protection system for data replication, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of protecting data stored and transmitted in a computer network, comprising:
   receiving confidential data from a client, the data organized into labeled fields and corresponding data elements;
   filtering the received data to identify fields that require data masking;
   masking the data elements of the received data corresponding to the identified fields;
   separating the masked data into tokenized data having a respective token associated with each corresponding data element;
   storing the tokenized data on a blockchain secure ledger to ensure integrity of the received data and prevent an ability to tamper with the received data, wherein storing the tokenized data on the blockchain secure ledger comprises splitting the tokenized data into a sequence of two or more tokens for storage at two or more storage locations on one or more storage systems;
   generating a first sequence identifier and a second sequence identifier, wherein the first sequence identifier and the second sequence identifier when combined provide information for re-assembling the sequence of the two or more tokens;
   providing, to the client, the first sequence identifier; and
   saving the second sequence identifier in association with an identifier of the client.

2. The method of claim 1 wherein the network comprises a multi-tenant network, and wherein the tokenized data is split and separated on the basis of individual tenant ownership among multiple tenants.

3. The method of claim 2 wherein the network comprises an enterprise scale network having storage devices storing the data in geographically distributed locations.

4. The method of claim 1 further comprising generating a security prediction on the corresponding data elements using a machine learning process.

5. The method of claim 4 wherein the machine learning process comprises at least one of a logistic regression algorithm and a decision tree algorithm.

6. The method of claim 5 wherein the decision tree algorithm comprises one of a random forest algorithm and a boosting tree algorithm.

7. The method of claim 5 wherein the machine learning process further categorizes data rules by data type, data usage, system context, confidentiality level, and minimum required encryption strength.

8. The method of claim 7 wherein the machine learning process further categorizes law for protection by at least one of: data type, rationale, data type patterns, and confidentiality range.

9. The method of claim 7 wherein an encryption method sets an encryption method, encryption strength, and encryption API (application programming interface) location and type.

10. The method of claim 1 further comprising:
    receiving a request from the client to access the stored data, the request including the identifier of the client;
    finding the second sequence identifier based on the received identifier of the client;
    combining the first sequence identifier and the second sequence identifier to obtain the sequence of the two or more tokens;
    retrieving the data from the one or more storage systems using the obtained sequence; and
    sending the data to the client.

11. An apparatus protecting data stored and transmitted in a computer network, comprising:
    an interface receiving confidential data from a client, the data organized into labeled fields and corresponding data elements;
    a data encryption processor filtering the received data to identify fields that require data masking;
    a masking processor masking the data elements of the received data corresponding to the identified fields;
    a data tokenization processor separating the masked data into tokenized data having a respective token associated with each corresponding data element;
    a blockchain secure ledger data storage processor storing the tokenized data on a blockchain secure ledger to ensure integrity of the received data and prevent an ability to tamper with the received data, wherein storing the tokenized data on the blockchain secure ledger comprises splitting the tokenized data into a sequence of two or more tokens for storage at two or more storage locations on one or more storage systems;
    a first processing component generating a first sequence identifier and a second sequence identifier, wherein the first sequence identifier and the second sequence identifier when combined provide information for re-assembling the sequence of the two or more tokens; and
    the interface being further configured to provide, to the client, the first sequence identifier and to save the second sequence identifier in association with an identifier of the client.

12. The apparatus of claim 11 wherein the network comprises a multi-tenant network, and wherein the tokenized data is split and separated on the basis of individual tenant ownership among multiple tenants, and wherein the network comprises an enterprise scale network having storage devices storing the data in geographically distributed locations.

13. The apparatus of claim 11 further comprising a machine learning data identification processor generating a security prediction on the corresponding data elements using a machine learning process.

14. The apparatus of claim 13 wherein the machine learning process comprises at least one of a logistic regression algorithm and a decision tree algorithm, the decision tree algorithm comprising one of a random forest algorithm and a boosting tree algorithm.

15. The apparatus of claim 13 wherein the machine learning process further categorizes data rules by data type, data usage, system context, confidentiality level, and minimum required encryption strength.

16. The apparatus of claim 15 wherein the machine learning process further categorizes law for protection by at least one of: data type, rationale, data type patterns, and confidentiality range.

17. The apparatus of claim 16 wherein an encryption method sets an encryption method, encryption strength, and encryption API (application programming interface) location and type.

18. The apparatus of claim 11 further comprising a second processing component:
receiving a request from the client to access the stored data, the request including the identifier of the client;
finding the second sequence identifier based on the received identifier of the client;
combining the first sequence identifier and the second sequence identifier to obtain the sequence of the two or more tokens;
retrieving the data from the one or more storage systems using the obtained sequence; and
sending the data to the client.

19. A computer program product, comprising a non-transitory computer-readable medium having a computer-readable program code embodied therein, the computer-readable program code adapted to be executed by one or more processors to perform a method of protecting data stored and transmitted in a computer network, by:
receiving confidential data from a client, the data organized into labeled fields and corresponding data elements;
filtering the received data to identify fields that require data masking;
masking the data elements of the received data corresponding to the identified fields;
separating the masked data into tokenized data having a respective token associated with each corresponding data element;
storing the tokenized data on a blockchain secure ledger to ensure integrity of the received data and prevent an ability to tamper with the received data, wherein storing the tokenized data on the blockchain secure ledger comprises splitting the tokenized data into a sequence of two or more tokens for storage at two or more storage locations on one or more storage systems;
generating a first sequence identifier and a second sequence identifier, wherein the first sequence identifier and the second sequence identifier when combined provide information for re-assembling the sequence of the two or more tokens;
providing, to the client, the first sequence identifier; and
saving the second sequence identifier in association with an identifier of the client.

20. The computer program product of claim 19 wherein the network comprises a multi-tenant network, and wherein the tokenized data is split and separated on the basis of individual tenant ownership among multiple tenants, and further wherein the network comprises an enterprise scale network having storage devices storing the data in geographically distributed locations.

* * * * *